July 5, 1955 — K. W. MACDONALD — 2,712,213
ROBE FRINGING MACHINE
Filed Feb. 10, 1954 — 9 Sheets-Sheet 7

INVENTOR
Kenneth W. Macdonald
BY J. Stanley Churchill
ATTORNEY

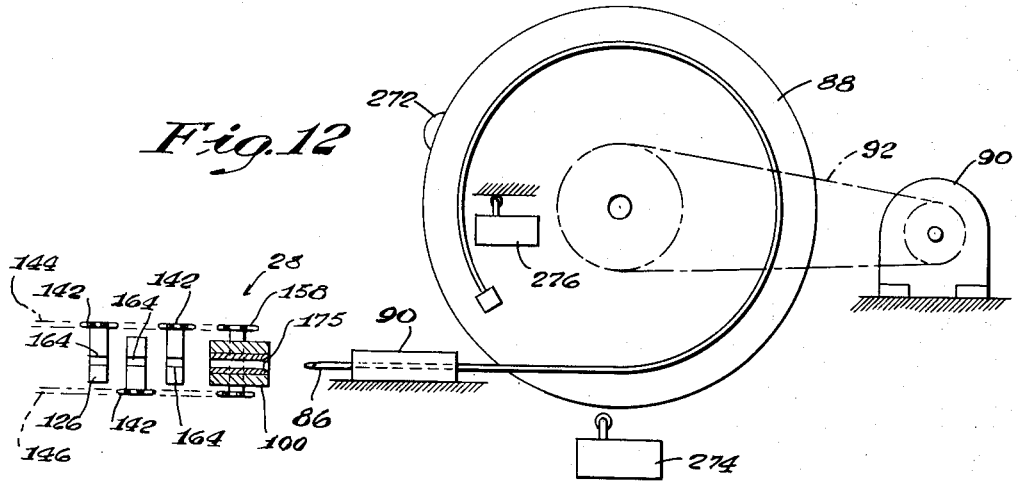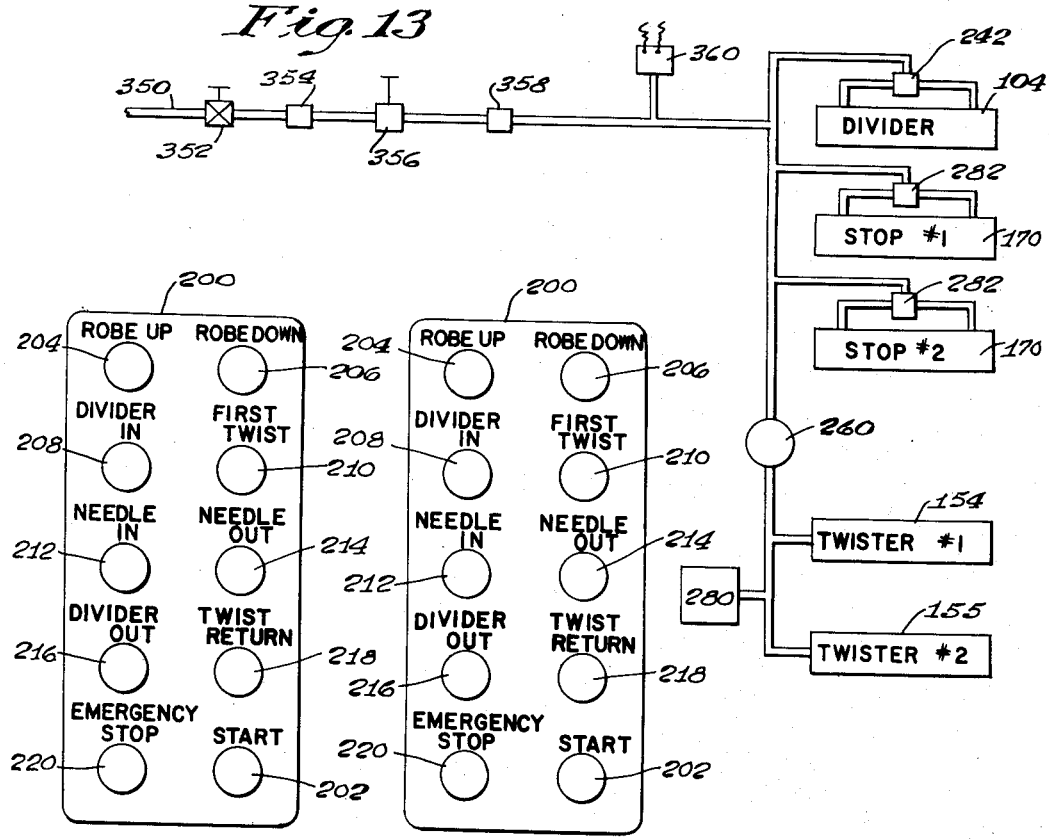

July 5, 1955  K. W. MACDONALD  2,712,213
ROBE FRINGING MACHINE
Filed Feb. 10, 1954  9 Sheets-Sheet 9

INVENTOR.
Kenneth W. Macdonald
BY
J. Stanley Churchill
ATTORNEY

United States Patent Office 2,712,213
Patented July 5, 1955

2,712,213
ROBE FRINGING MACHINE

Kenneth W. Macdonald, Arlington, Mass., assignor, by mesne assignments, to Troy Blanket Mills, Troy, N. H., a corporation of New Hampshire Application February 10, 1954, Serial No. 409,445

16 Claims. (Cl. 57—1)

This invention relates to a robe fringing machine.

The invention has for an object to provide a novel and improved construction of robe fringing machine capable of producing substantially uniform and relatively tightly twisted fringes in an efficient and superior manner.

A further object of the invention is to provide a novel and improved robe fringing machine of the character specified wherein the various operations are performed in a predetermined sequence and wherein provision is made for assuring that the various operations are performed in such predetermined sequence.

With these general objects in view and such others as may hereinafter appear, the invention consists in the robe fringing machine and in the various structures, arrangements and combinations of parts hereinafter described and particularly defined in the claims at the end of this specification.

In the drawings illustrating the preferred embodiment of the invention:

Fig. 12 is a diagrammatic view of the needle feeding wheel by which the retaining thread is inserted between the twisted fringe portions;

Fig. 13 is a diagrammatic view of the air lines forming a part of the control mechanism;

Fig. 14 is a front elevation of duplicate control panels showing the control buttons to be pressed in sequence to perform the various operations.

In general the present invention contemplates a novel and improved construction of robe fringing machine of the type wherein the robes to be fringed are connected in a continuous length, the portions to be fringed comprising sections in which the woof or cross threads are discontinued for a predetermined length leaving the warp threads between adjacent robe sections of a length sufficient to form two fringed edges.

In practice the warp threads extended between adjacent robe sections are divided into bunches, the twisting means including a member extended transversely through each bunch which is then rotated to twist the strands and form the fringe. In operation it is desirable that a substantially equal number of strands be disposed on either side of the transverse twisting member in order to permit a relatively tight twisting force without liability of breaking of the strands during the twisting operation. In accordance with one feature of the present invention novel and improved thread dividing means is provided whereby to assure a substantially equal number of threads on each side of the transversely extended twisting member. Novel operating means is also provided for advancing the dividing head into operative relation to the twisting head and for rotating the twisting means whereby to assure smoothly operating and accurate performance.

In practice, the various operations involved in the handling of the robe material and the formation of the twists may and preferably will be initiated by manually pressing a control button for the desired operation. Another feature of the present invention is the provision of control means adapted to prevent initiation of a particular operation when a button is pressed in other than a predetermined sequence whereby to assure the performance of the various operations in the predetermined sequence.

In the operation of the machine provision is made for tying the twisted fringes to prevent untwisting thereof, the twisted portions being subsequently subjected to a shrinking operation to retain the twist whereupon the tie thread is removed. It will be understood that each twisting element operates to twist a bunch of warp threads at the center of the length between adjacent robe sections so that the twist will be in opposite directions on each side of the center. After the tying and shrinking operations the fringes are cut along the center to provide fringes on the edges of both adjacent robe sections.

Figure 1:
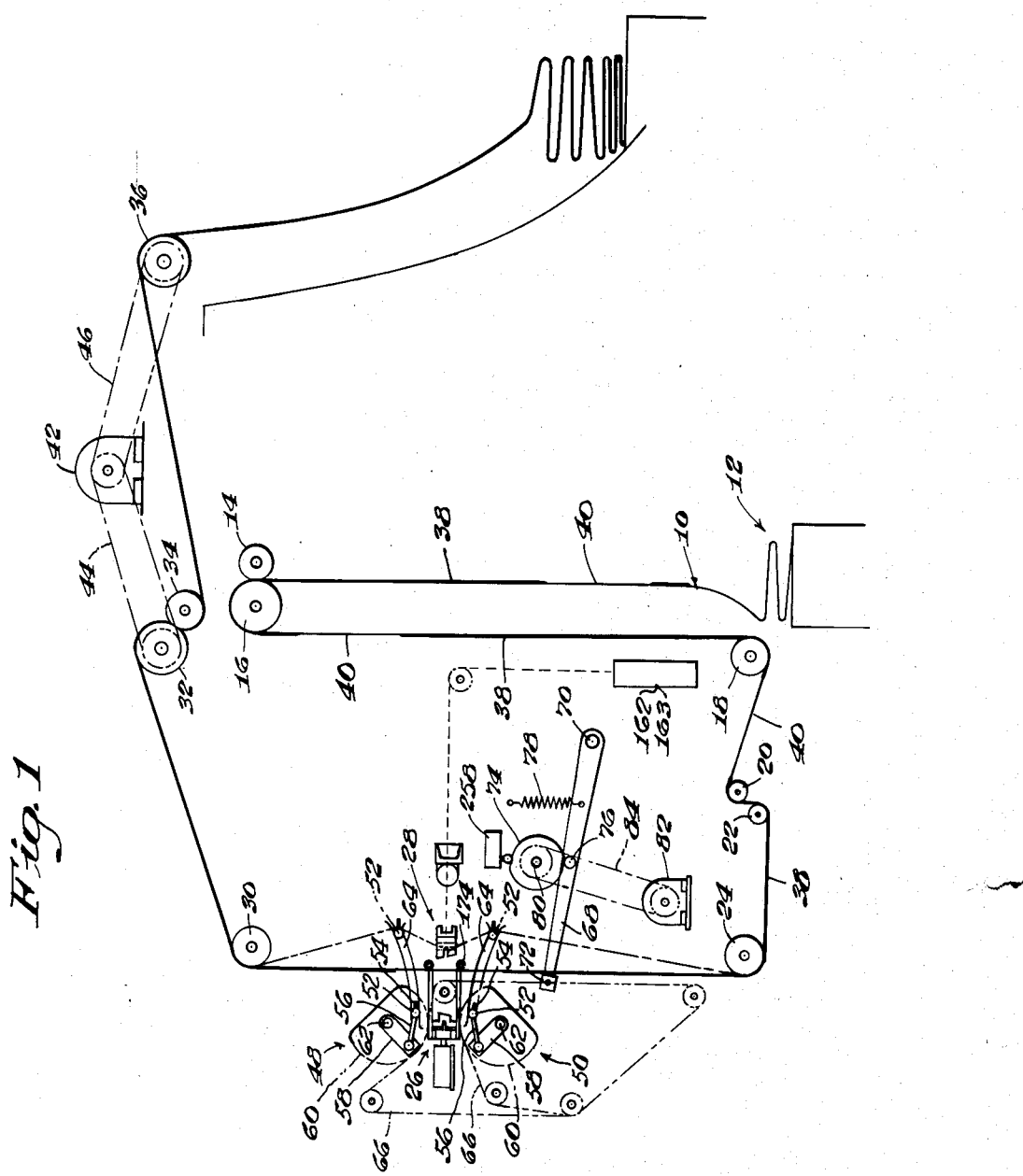
Fig. 1 is a diagrammatic outline view of a robe fringing machine embodying the present invention.

Referring now to the drawings and particularly to Fig. 1, in general in the operation of the machine a continuous length of robe material 10 is withdrawn from a supply thereof, indicated generally at 12, and passed between rollers 14, 16 and is then led downwardly around roller 18 and over tensioning rollers 20, 22. The material is then guided under a lower positioning or centering roller 24 and extended upwardly between the dividing head and the twisting head, indicated generally at 26, 28 respectively, and then over an upper positioning roller 30. The material is then passed over a driven feed roll 32 having a cooperating tensioned roller 34 and then passes over a second driven roller 36 and led downwardly, at which point the fringed material may be inspected and collected for subsequent operations.

The continuous length of material comprises a series of robe sections 38 connected by fringe forming sections 40 from which the cross threads have been omitted and is arranged to be advanced to present a fringe forming section 40 in operative relation to the dividing head and the twisting head by a reversing motor 42 connected by a chain and sprocket drive 44 to the feed roll 32. A second chain and sprocket drive 46 is connected to the driven delivery roller 36 as shown in Fig. 1. In practice the robe material may be advanced or retracted short distances by the reversing motor 42 to present a fringe forming section 40 in operative relation to the dividing and twisting heads whereupon the dividing head 26 is advanced to divide the fringe forming threads into substantially equal bunches or bundles and to guide the divided bunches into the twisting sleeves of the twisting head.

In order to maintain the robe material under a tension during the twisting operation and to assure that the fringe forming bunches are fully seated in the twisting sleeves, upper and lower spreaders, indicated generally at 48, 50 respectively are provided, each spreader comprising a transverse bar 52 having a plurality of pins 54 and arranged to be advanced to extend the pins between the threads of the fringe forming sections 40 and to engage the edges of the adjacent robe sections 38 to maintain the fringe forming sections 40 taut during the twisting operation, as indicated in dotted lines in Fig. 1. Each spreader bar 52 may be carried by a link 56 pivotally mounted in an arm 58 fast on a rocker plate 60 rockingly mounted on a shaft 62. The spreader bars 52 are guided in stationary cam paths 64 which may be formed in the side frames of the machine and are arranged to be reciprocated by chain and sprocket drives 66 guided over segmental sprocket teeth formed on the rocker plates 60. The chain is arranged to be advanced and retracted by an arm 68 pivotally mounted at 70 and connected at its outer end to a link of the chain as indicated at 72. A cam 74 cooperates with a roller 76 carried by the arm 68 to effect movement of the chains in one direction, and a spring 78 is arranged to rock the arm to effect movement of the chain in the other direction. The cam 74 is mounted fast on a cam shaft 80 arranged to be rotated by a reversing motor 82 connected by a chain and sprocket drive 84 to the cam shaft 80.

As will be hereinafter more fully described, after the twisting operation the twisting sleeves are disposed with transverse openings in alignment through which a needle is extended between the twisted fringe portions, the needle being manually threaded when it has passed through the opposite end of the twisting head. Thereafter the needle is retracted to extend the thread through the fringe portions, the thread being then removed from the needle and tied to retain the fringes in their twisted condition. As indicated in Fig. 12, the needle 86 may be wound about a wheel 88 and extended through a guide block 90 arranged to direct the needle through the twisting head 28, as indicated. The wheel 88 is arranged to be rotated to extend and retract the needle through the twisting head by a reversing motor 90 connected to the wheel by a chain and sprocket drive 92.

The twisting sleeves are then rotated to a position to permit removal of the twisted and tied fringe portions, and the dividing head is retracted whereupon the twisting sleeves are returned to their initial position preparatory to a succeeding twisting operation.

It will be understood that certain of the above-described operations are initiated by manually pressing a start button for the particular operation, and others are initiated automatically by the preceding operation, and control means to be described is provided to assure that all of the operations are carried out in their proper sequence.

Figure 2:
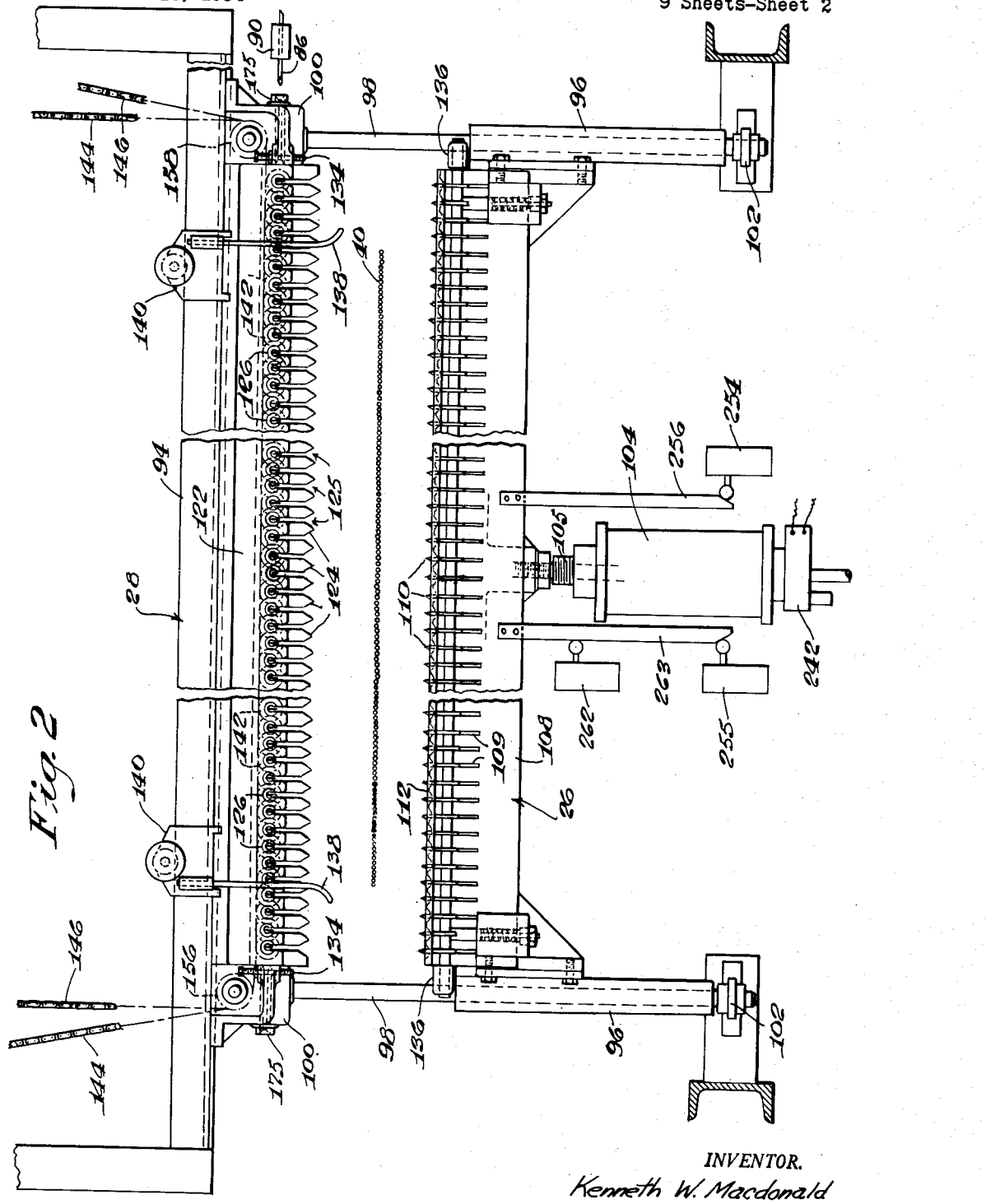
Fig. 2 is a plan view of a portion of the robe fringing machine.
Figure 4:
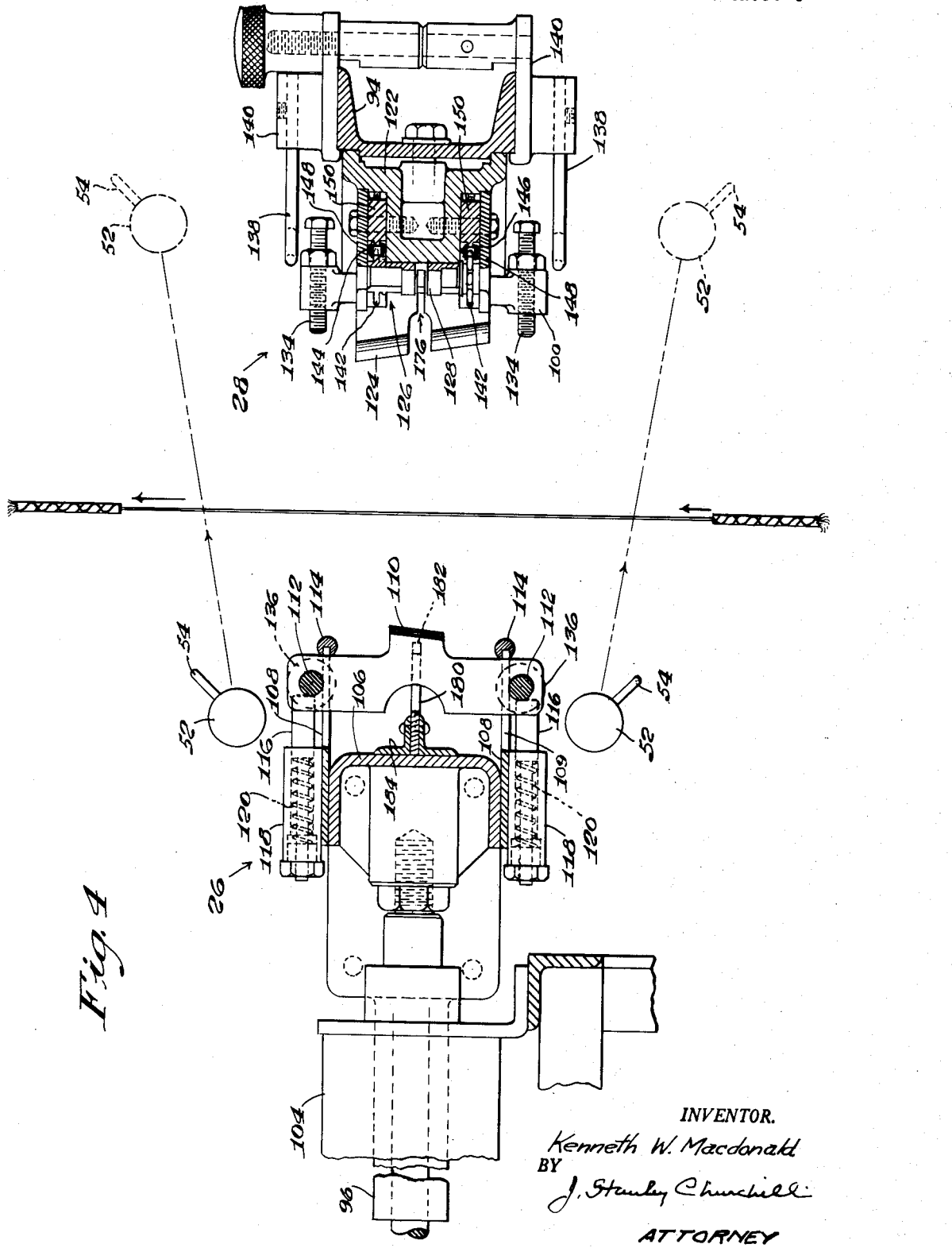
Fig. 4 is a cross-sectional view of the dividing head and the twisting head showing the robe positioned therebetween.
Figure 5:
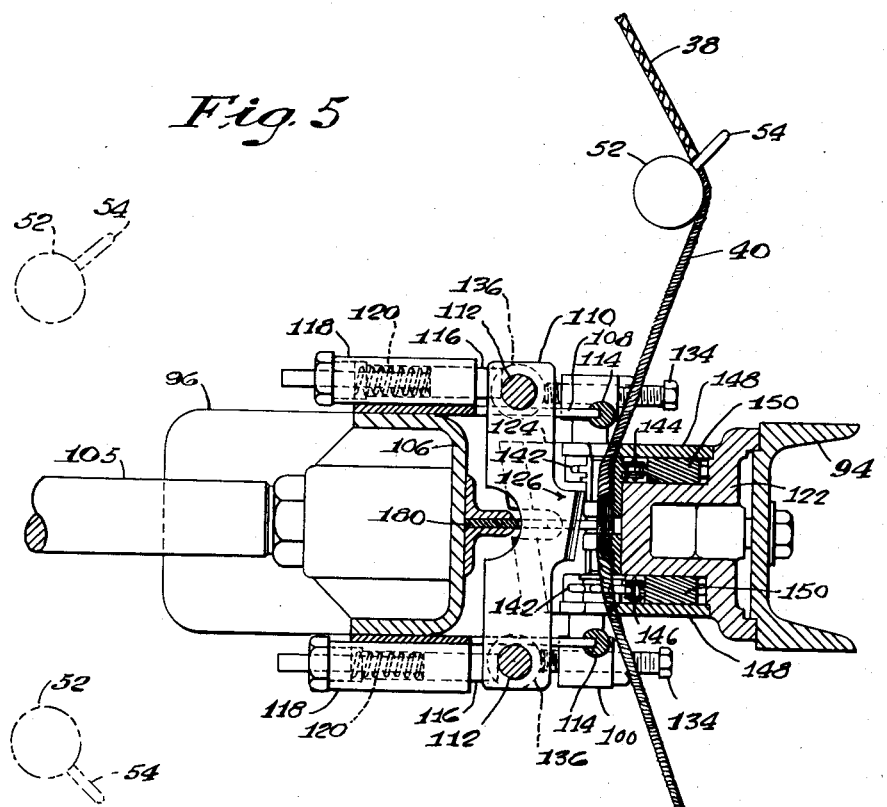
Fig. 5 is a similar view showing the dividing head in operative relation to the twisting head and showing the fringe portions of the robe twisted.
Figure 6:
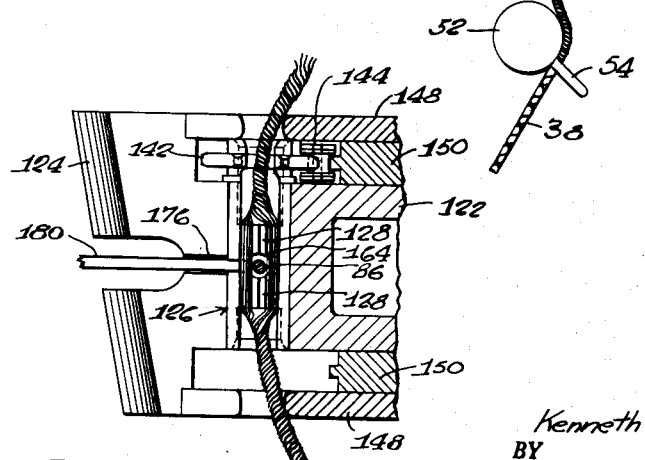
Fig. 6 is a cross section detail view of the twisting head showing the twisting sleeves rotated to align the transverse openings through which a retaining thread is extended.

Referring now particularly to Figs. 2, 4 and 5 for a more detailed description of the dividing head 26 and the twisting head 28, it will be observed that the twisting head is fixed to a channel member 94 supported between the side frames of the machine, and the dividing head 26 is supported between elongated sleeve brackets 96 slidingly mounted on parallel rods 98. The slide rods 98 are supported at one end in brackets 100 secured to the channel member 94 and at the other end in brackets 102 attached to the machine frame. The dividing head 26 is arranged to be moved into and from operative relation to the twisting head 28 by an air motor 104 suitably supported in the frame of the machine, the piston 105 of the motor being connected to a substantially central portion of the dividing head as shown.

As illustrated in Fig. 4, the dividing head 26 includes an elongated bracket 106 U-shaped in cross section having guide plates 108 extended from each side thereof, each plate being provided with a plurality of equally spaced slots 109 arranged to slidingly support a plurality of dividing blades 110. The dividing blades 110 are mounted in spaced relation on the rods 112 and are provided with extended blade portions arranged to engage the threads when the dividing head is advanced.

The guide plates 108 are provided with rods 114 secured to the outer edges thereof, and the dividing blades 110 are resiliently maintained in an extended position against the underside of the guide plate rods 114 when the dividing head is in its retracted position, as shown in Fig. 4. As herein shown, the dividing blades are supported and maintained in their extended position by spring-pressed pins 116 disposed at each end of the dividing head, each pin 116 being slotted to fit over the outer edge of an adjacent blade 110 carried by the tie rods 112. Each pin 116 is mounted in a bracket 118 secured to the side of the dividing head, and a spring 120 disposed within the bracket is arranged to bear against a shouldered portion of the pin to urge the pin outwardly.

Figure 10:
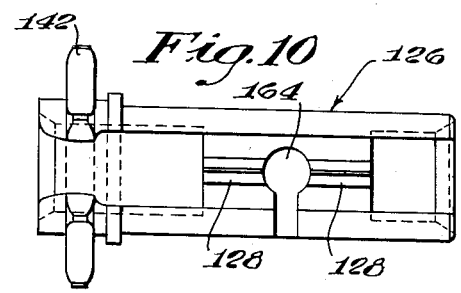
Figs. 10 and 11 are detail views in side and end elevations respectively of a twisting sleeve.
Figure 11:
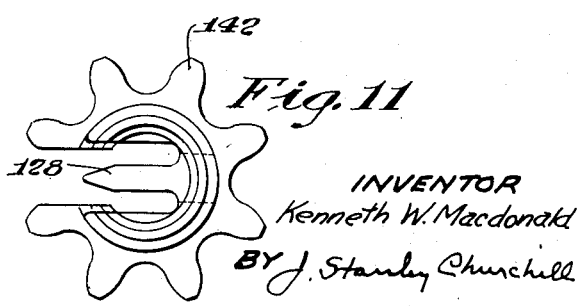

The twisting head 28 includes a bracket 122 secured to the channel member 94, the bracket 122 being provided with a plurality of pointed teeth or dividing fingers 124 forming a guide slot 125 between the spaced teeth, each guide slot 125 terminating in an opening forming a bearing in which a twisting sleeve, indicated generally at 126, is rotatably mounted. As shown in detail in Figs. 10 and 11, each twisting sleeve 126 is open on one side to receive the divided threads to be twisted, the twisting sleeve being provided with a central twisting blade 128 extended from the inner wall across the axis of the twisting sleeve toward the open side thereof and terminating at a point within the circumference of the outer or bearing wall of the sleeve, as shown.

Figure 8:
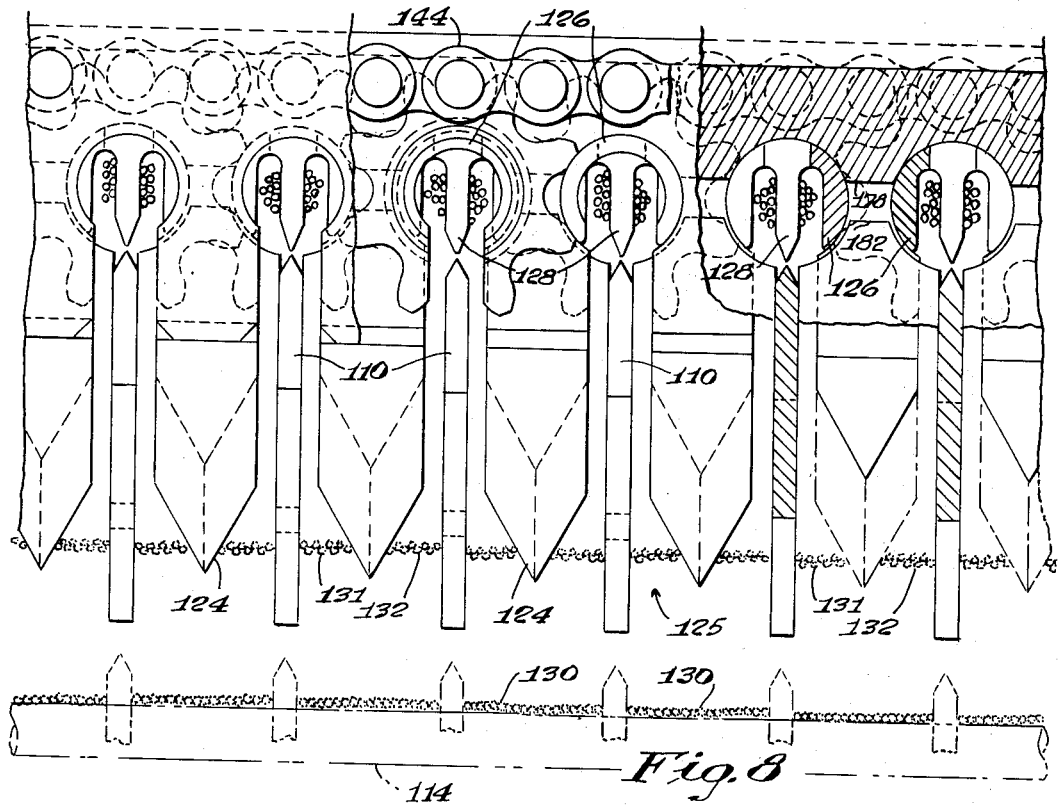
Fig. 8 is an enlarged detail view of a portion of the twisting head in plan elevation, portions being broken away and shown in cross section.

From the description thus far it will be observed that in the operation of the machine, when the dividing head 26 is advanced toward the twisting head 28 the dividing blades 110 engage the threads extended between the robe sections and separate them into substantially equal groups or bunches 130, as indicated in dotted lines in the lower portion of Fig. 8, the grouped threads being engaged at this time by the rods 114 extended along the outer edges of the guide plates 108. It will be seen that the extended portion of the blade 110 is inclined at an angle from the vertical plane of the threads to be divided so as to facilitate entrance of the blade between the threads. It will also be observed that the dividing fingers 124 are similarly inclined at their outer ends for the same purpose, as shown in Fig. 4. Upon further advance of the dividing head toward the twisting head each group of threads thus divided is again divided to separate each group 130 in half by engagement with the teeth 124 of the twisting head, thus forming two bunches 131, 132 of each group with a substantially equal number of threads in each half portion, as indicated in dotted lines in Fig. 8. As the dividing head continues its movement, the divided bunches of threads are pushed into the guide slots 125 by the upper and lower rods 114, the threads being maintained in their divided condition by the blades 110 and by engagement with the walls of the slots 125. It will be observed that the blades 110 are offset from the teeth 124 of the twisting head and extend centrally into the slots 125, as shown. Further advance of the dividing head effects guiding of the divided threads into the twisting sleeve to dispose a half portion on each side of the twisting blade 128, the rods 114 being extended to push the threads into a fully seated position in the twisting head.

The advancing movement of the dividing blades 110 may be adjustably limited by stop screws 134 carried by brackets 100 disposed on each side of the twisting head which are arranged to engage collars 136 fast on the ends of the tie rods 112 on which the dividing blades are mounted. The dividing blades 110 are arranged to come to rest with the points thereof in alignment with the points of the twisting blades 128, as shown in full lines in Fig. 8, thus preventing commingling of the threads in one half bunch with the threads of the other half bunch during their movement into the twisting sleeve and assuring a substantially equal number of threads on each side of the twisting blade. Thereafter, further movement of the dividing head to the limit of its stroke will depress the springs 120 in the brackets 118 and extend the bars 114 carried by the guide plates 108 which at this time push the threads off the dividing blades and into the twisting sleeves, as shown in Figs. 5 and 8. In operation the advancing movement of the dividing head automatically initiates movement of the spreader bars 52 to effect tensioning of the threads extended between adjacent robe sections, as shown in Fig. 5, such movement also serving to assure full seating of the divided threads in their respective twisting sleeves. It will be seen that the structure above recited wherein the threads are first divided into equal groups and then again divided into half portions prior to entering the twisting sleeves, and wherein the half portions are positively guided into each side of the twisting bar results in a more uniform and positive division of the threads to be twisted and formed into fringe portions and permitting a relatively tighter twist to be formed without breakage of the threads during the twisting operation.

As illustrated in Fig. 2, the dividing and twisting heads 26, 28 respectively may be of sufficient length to accommodate the maximum width of robe to be fringed and are adapted to form fringes on robes of lesser width. As herein shown, the marginal edges of the robe may be guided into operative relation to the twisting head by curved guide rods 138 carried in brackets 140 adjustably clamped to the supporting channel 94.

Figure 7:
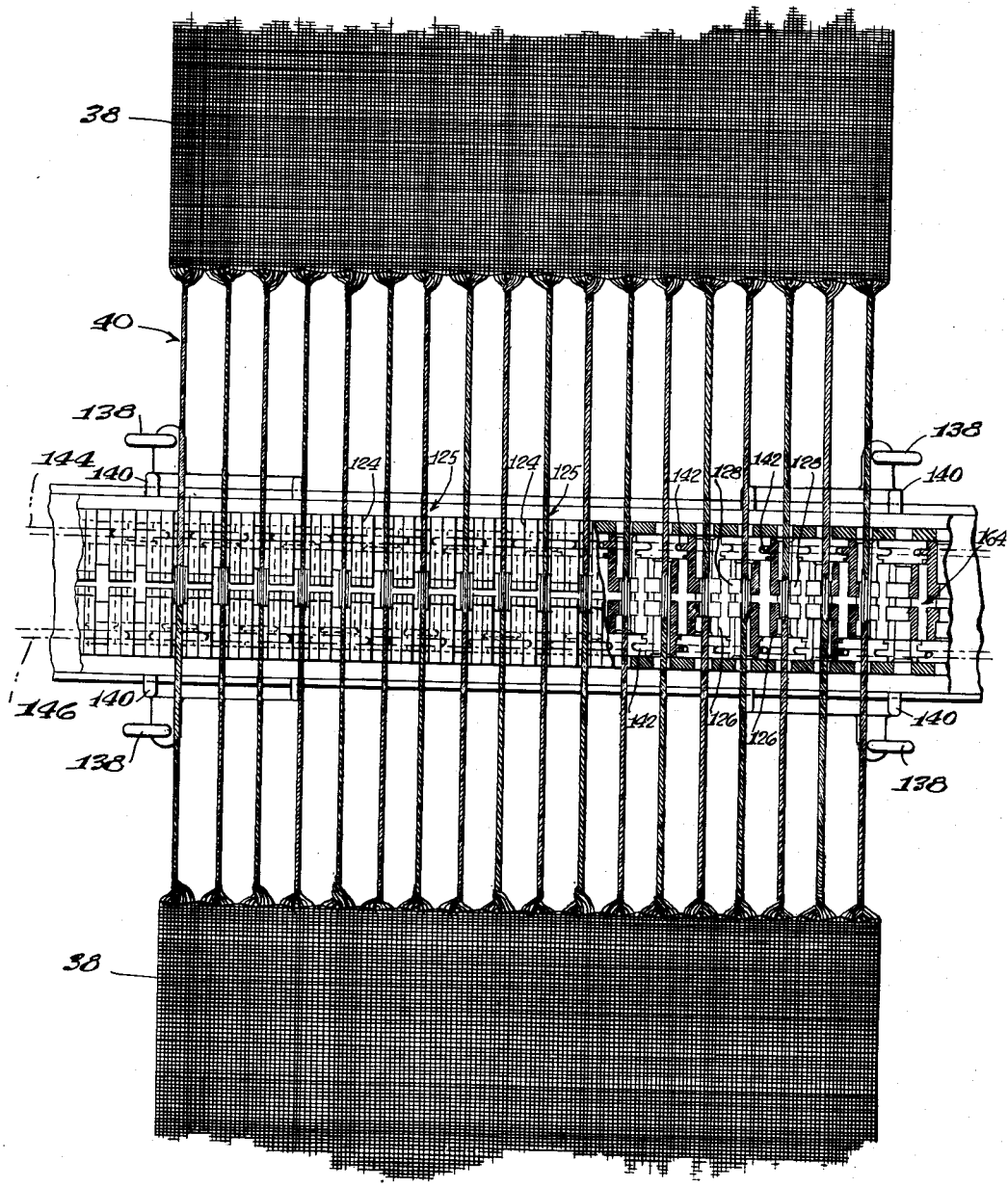
Fig. 7 is a front elevation of the twisting head showing the fringe portions twisted.

Each twisting sleeve 126 is provided with a sprocket 142 formed integrally therewith and having one of the spaces between the teeth cut out in alignment with the open side of the sleeve to permit entrance of the threads to be twisted. As shown in Figs. 7 and 8, alternate sleeves are disposed with the sprockets on opposite sides and are arranged to be rotated by upper and lower chains 144, 146 respectively, engageable with their respective sets of sprockets. As shown, in detail in Fig. 4, the twisting sleeves 126 rotatably mounted in the twisting head 28 are restrained from longitudinal displacement by retaining plates 148, and the chains 144, 146 are held in operative engagement with their sprockets by spacing members 150.

Figure 3:
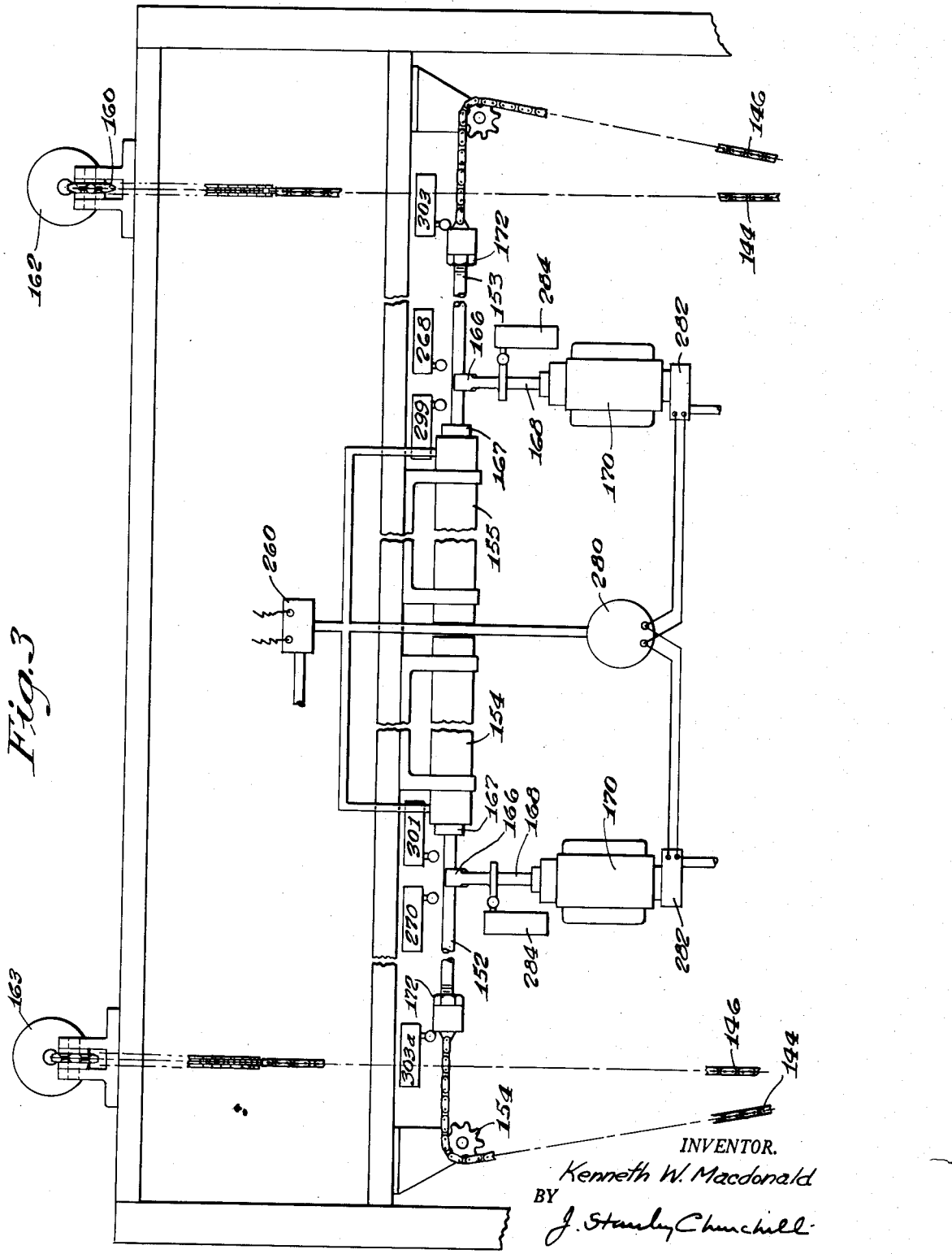
Fig. 3 is a continuation of the remaining portion of the plan view shown in Fig. 2.

Referring now to Figs. 2 and 3, one chain 144 is connected at one end to the piston 152 of an air motor 154 and runs over guide sprockets 154, 156, then over the sprockets 142 of alternate sleeves 126, around guide sprocket 158 and over sprocket 160, the other end of the chain 144 depending from the sprocket 160 and being provided with a weight 162. The other chain 146 is similarly connected at one end to the piston 153 of air motor 155 and running over similar guide sprockets to dispose the chain in engagement with the sprockets 142 of the remaining sleeves 126, the other end of the chain being provided with a weight 163. Thus, in operation, one set of twisting sleeves is rotated in one direction to effect twisting of alternate fringe portions, and the other set of twisting sleeves is rotated in the opposite direction to effect twisting of the remaining fringe portions, as indicated in Fig. 7.

Figure 9:
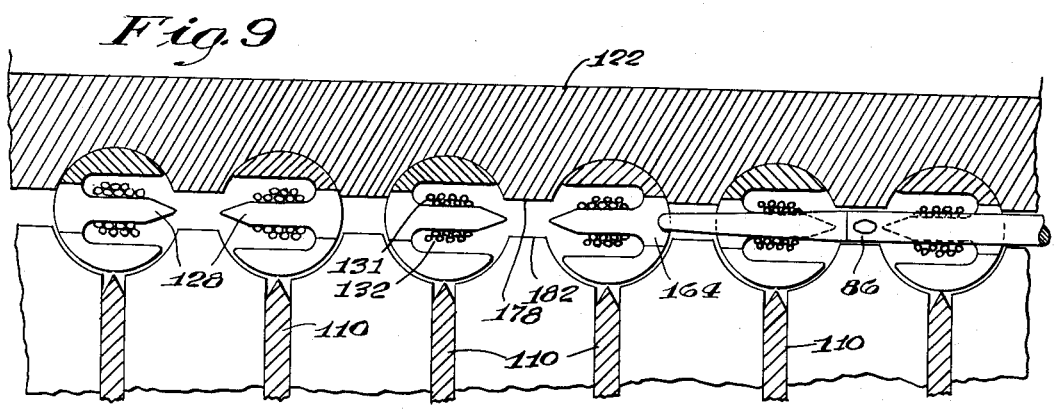
Fig. 9 is a similar view showing the twisting sleeves rotated into alignment to receive the retaining thread.

In practice the twisting sleeves are initially positioned with the open sides in alignment with the slots 125 of the twisting head to receive the threads to be twisted, as shown in Fig. 8, and in operation the air motors 154, 155 are arranged to rotate the sleeves a predetermined number of revolutions to bring the sleeves to rest in the position shown in Fig. 9 wherein the transverse needle openings 164 in the sleeves are in alignment in which position the needle 86 is extended through the opening and threaded, the needle then being retracted with the tie thread as previously described, the thread being disposed between the half portions 131, 132 of each fringe and tied to retain the fringe in its twisted condition. The number of revolutions of the sleeves effected by the air motors 154, 155 is arranged to be controlled by stop arms 166 formed on the ends of piston rods 168 actuated by air motors 170. Stop nuts 172 carried by the outer ends of the piston rods 152, 153 are arranged to engage the stop arms 166 at the end of a predetermined number of revolutions as determined by adjustment of the stop nuts to bring the sleeves to rest in the position shown in Fig. 9. After the tie thread has been extended through the openings, as described, the stop arms 166 are retracted by their air motors 170 to permit the pistons 152, 153 to move a further distance against stop 167 to effect rotation of the sleeves another one-quarter turn to again bring the open sides of the sleeves in alignment with the slots 125 to permit removal of the twisted fringe portions from the sleeves. Removal of the twisted fringe portions from the sleeves may be effected upon retraction of the dividing head 26 by stripping bars 174 carried by the dividing head, as indicated in Fig. 1. Thereafter, the air motors 154, 155 are controlled to permit the weights 162, 163 to retract the chains 144, 146 to return the sleeves 126 to their initial position, as shown in Fig. 8, in readiness for a succeeding cycle of operation, the air motors 170 being also operated to return the stop arms 166 into the path of the stop nuts 172.

As shown in Fig. 2, the chain guide sprockets 156, 158 are rotatably supported in the brackets 100 at each end of the twisting head. It will also be observed that the brackets 100 support needle guides 175 extended through the brackets to align the needle with the transverse openings in the sleeves. Provision is also made for guiding the needle through the twisting head between adjacent sleeves. As illustrated in Fig. 4, the twisting head 28 is provided with a slotted portion 176 extending the full length of the twisting head bracket 122, the slot 176 terminating a short distance beyond the center line of the twisting sleeves and forming lands 178, see Fig. 8, providing a guide on one side for the needle passing between adjacent twisting sleeves 126. Into this slot 176 is extended a guide plate 180 carried by the dividing head 26, the plate 180 being provided with spaced arcuate cutouts forming lands 182 therebetween, the plate being projected into the slot to dispose the lands 182 equally distant from the other side of the center line of the twisting sleeves, as shown in Fig. 8, providing a cooperating guide for the needle passing between adjacent twisting sleeves 126. As shown in cross section in Fig. 4, the plate 180 is secured to the U-shaped bracket of the dividing head by angle bars 184 and is disposed substantially centrally of the dividing head and in alignment with the slotted portion 176. The plate 180 is also slotted in a manner similar to the outer guide plates 108, to accommodate the dividing blades 110. It will be understood that the number of turns of the twisting sleeves 126 may be adjustably varied by adjustment of the nut 172 or the provision of spacers of different thickness behind the nut 172.

Figure 15:
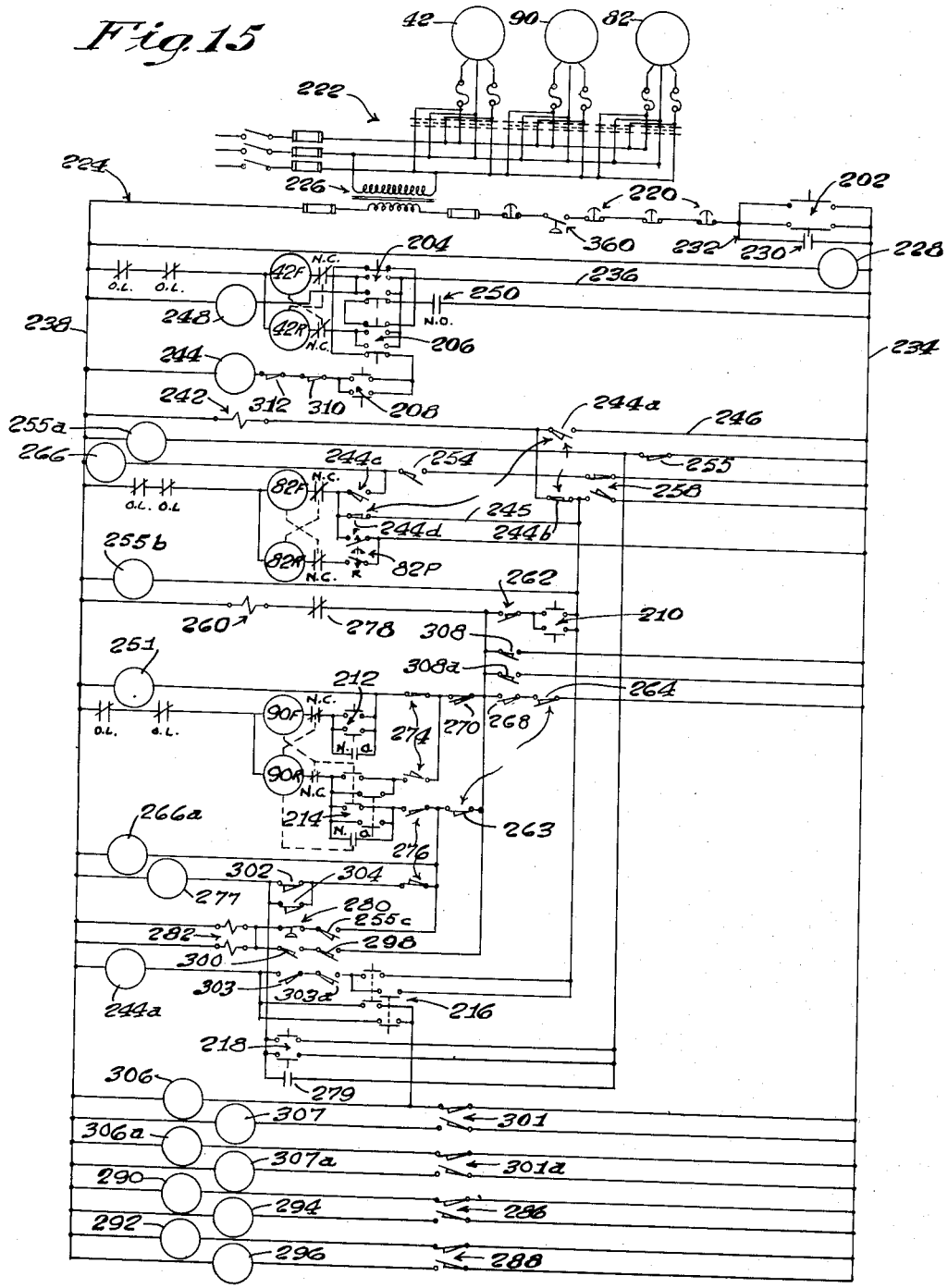
Fig. 15 is a wiring diagram adapted to assure performance of the various operations in a predetermined sequence.

The various mechanisms for performing the robe handling and twisting operations above described are arranged to be controlled by an electrical circuit, shown in Fig. 15, and a particular operation may be initiated by pressing a control button on either one of duplicate control panels, shown in Fig. 14, the panels 200 being situated at different locations in the machine for the convenience of the operator. Thus, in general the start button 202 is first pushed to energize the control circuit, and the robe feed button 204 may then be pressed to start the robe feed motor 42 in one direction to position the robe with the threads to be twisted in a substantially central position between the dividing head 26 and the twisting head 28. The robe advancing movement is stopped upon release of the feed button 204, and in the event that the robe has been overfed relative to the dividing and twisting heads the robe retracting button 206 may be pressed to reverse the motor 42 and permit the robe to be properly positioned, the motor being stopped upon release of the reversing button 206. Thereafter, pressing of the divider advancing button 208 closes a circuit to operate the air motor 104 to advance the dividing head 26 toward the twisting head, the spreader motor 82 being automatically started by movement of the divider head to move the spreader bars 52 forward. Forward movement of the divider head and the spreader bars effects division of the threads into bunches and insertion of the divided bunches into the twisting sleeves 126 in a taut condition. The twisting button 210 may then be pressed to effect operation of the air motors 154, 155 to rotate the twisting sleeves 126, the rotation being continued for a predetermined number of revolutions until the piston nuts 172 engage the stop arms 166, at which time the sleeves are aligned as shown in Fig. 9 with the thread or needle openings 164 in horizontal alignment. The needle advancing button 212 may then be pushed to operate the needle motor 90 to project the needle 86 through the openings and between the twisted threads, the needle motor being stopped automatically when the needle has passed through the twisting head, a thread being threaded through the eye of the needle in this position. Thereafter, the needle retracting button 214 may be pressed to effect reversal of the motor 90 to retract the needle with the thread attached whereupon the thread is removed from the needle and tied to retain the fringed sections in their twisted condition. The stop arm operating motors 170 are automatically operated upon return of the needle wheel 88 to its initial position to retract the stop arms 166, thus permitting the air motors 154, 155 to effect another quarter turn of the twisting sleeves 126 to position the same with their open sides in alignment with the slots 125 in the twisting head to permit removal of the twisted fringe portions. The divider retracting button 216 may then be pressed to effect return movement of the dividing head, the fringed sections being stripped from the twisting sleeves by the stripper bars 174 carried by the dividing head. The spreader bars 52 are automatically retracted upon movement of the dividing head in a reverse direction. The divider retracting button 216 is then released, and the twisting sleeve return button 218 may be pushed to operate a valve which reduces the air pressure in the cylinders 154, 155, thus permitting the twisting sleeves 126 to be rotated in a reverse direction by the weights 162, 163 to return the sleeves to their initial position in readiness for a succeeding twisting operation. The stop arms 166 are also automatically returned to their operative position upon return of the twisting sleeves to their initial position. The robe feed button 204 may then be pressed to initiate another cycle of operation. The emergency stop buttons 220 may be pressed at any time to open one side of the control power line, deenergizing all controls and requiring pressing of the start button 202 to resume normal operation.

In accordance with another feature of the present invention provision is made for controlling the operation of the machine in a manner such as to assure operation of the various mechanisms in the predetermined sequence, as above described, and to prevent initiation of any particular operation in any other than the predetermined sequence by the provision of interlocking controls between the circuits controlling initiation of the various mechanisms. As illustrated in Fig. 15, the circuit includes the reversing motors 42, 90, 82 connected in a 550 volt line, indicated generally at 222, which provides 110 volt power to the control circuit 224 through a transformer 226. Each reversing motor is provided with an individual reversing starter in the control circuit, the robe motor 42 having forward and reverse starters 42F and 42R; the spreader motor 82 having forward and reverse starters 82F and 82R; and the needle motor 90 having forward and reverse starters 90F and 90R respectively. It will be observed that the switches for initiating operation of the various mechanisms are shown in duplicate in the control circuit 224, and are numbered to correspond to the buttons shown on the duplicate control panels 200.

In operation when the start button 202 is pressed to energize the control circuit 224, a relay 228 is energized to close a contact 230 in a holding circuit 232 to maintain the power in the control circuit during the operation of the machine. The robe advancing button 204 may then be pressed to close the circuit to the starter 42F from one side 234 of the control circuit, across line 236 to the other side 238 of the control circuit, the robe continuing its advance until the switch button 204 is released. The robe reversing button 206 may then be pressed if necessary to close the circuit to the robe reversing starter 42R, as shown, the robe reversing button being released when the robe has been properly positioned with relation to the dividing and twisting heads 26, 28. Upon pressing the start button other relays are energized including 255A release, 306 relay, 306a relay, 290 relay and 292 relay, and the robe feed circuit is energized.

The dividing head advancing button 208 may then be pressed to close the circuit to a four-way solenoid valve 242 for operating the air motor 104 to effect advance of the dividing head 26. Pressing of the button 208 energizes a relay 244 arranged to operate a single-pole double-throw switch to close a contact at 244a in the line 246 extending between the lines 234, 238, the relay latching itself in this position. Provision is made for preventing operation of the solenoid valve 242 in the event that the button 208 is pressed prior to pressing the robe feed button 204 in order to assure proper sequence of the operations. As shown in Fig. 15, this may be accomplished by providing a relay 248 arranged to be energized when the robe feed button 204 is pushed which operates a second single-pole double-throw switch to close the circuit at contact 250, the relay 248 latching itself in this position to permit the divider advancing circuit to be energized through switches 204, 206 in their open or inoperative position, as shown, when the divider advancing button 208 is subsequently pressed. Pressing of button 208 and operation of the relay 244 also effects closing of the circuit at contact 244c to render the spreader starter circuit operative upon starting of the forward movement of the dividing head 26. As herein shown, the circuit to the spreader starter 82F is completed by closing of switch 254 to automatically start the spreader motor 82 on its forward stroke. As shown in Fig. 2, the switch 254 cooperates with a cam piece 256 carried by the divider head 26. The forward movement of the spreaders 52 is stopped by a switch 258 arranged to cooperate with the cam 74, see Fig. 1, to open the circuit to the spreader motor starter 82F, the dividing head 26 coming to rest at the end of its fixed stroke.

Upon pressing of the divider advancing button 208 other interlocking relays are operated and contacts opened or closed in the following order: energization of relay 244 opens the spreader starter circuit at 244d, and 244c closes the same circuit; 244a energizes the divider valve 242, and 244b opens the divider valve holding circuit. When the dividing head moves in, switch 255 opens and 255a release is deenergized; 277 relay is deenergized opening contact 279 in the holding circuit; contact 278 closes three-way valve circuit; and relay 266A is deenergized. When switch 254 closes upon inward movement of the dividing head the spreader starter circuit is energized moving the spreaders in and release 266 is energized releasing relay 266A whereupon contact 263 opens relay 266A, relay 277 and needle reverse holding circuits. Contact 264 closes needle starter circuits. Closing of switch 262 closes the twisting circuit and cam operated switch 258 opens deenergizing 266 release and spreader advancing starter 82F. The spreader starter opens motor contacts and closes normally closed contact energizing reverse starter through plugging switch 82P. The motor 82 stops, opening plugging switch 82P and deenergizing reversing starter 82R. The cam operated switch 258 then closes energizing the valve 242 holding circuit; spreader starter 82F circuit; twisting circuit; and divider retracting circuit. The relay 255b is then energized latching in that position and contact 255c closes the stop valve circuit.

From the description of the electrical control mechanism thus far, it will be seen that the robe has been fed into operative position relative to the dividing and twisting heads 26, 28 and that the dividing head and the spreaders have been advanced to divide the threads into bunches and to present the divided bunches to the twisting sleeves 126. The first twist button 210 may then be pressed to energize the three-way valve solenoid 260 putting air pressure on the twister operating cylinders 154, 155. It will be observed that the forward movement of the dividing head 26 operates switch 262 in the first twist circuit so that operation of the dividing head advancing circuit must occur to close switch 262 before the twisting operation may be initiated by pressing the first twist button 210. As shown in Fig. 2, the switch 262 cooperates with a cam piece 263 carried by the dividing head. The switch 255 is also arranged to cooperate with the cam piece 263 as shown.

Upon movement of the pistons 152, 153 inwardly, the nuts 172 carried thereby engage the stop arms 166 to stop the rotation of the sleeves 126 in the needle receiving position, and at this time the needle operating button 212 may be pressed to close the circuit to the starter 90F. In order to prevent operation of the needle motor prior to the preceding operations the switch 264 in the needle advancing circuit is arranged to be closed by the relay 266 which is energized when the switch 254 is operated upon inward movement of the dividing head, and switches 268, 270 in the needle advancing circuit are arranged to be closed by movement of the pistons 152, 153, as shown in Fig. 3.

Pressing of the twist button 210 to energize the three-way valve 260 also effects opening of the pressure controller contact 289 when the pressure reaches a preset value, opening the stop valves 282 circuit. Upon movement of the twister pistons 152, 153, switch 301 opens opening the divider retracting circuit and deenergizing relay 306. Switch 301a also opens deenergizing relay 306A. Switches 301 and 301a then close energizing release relays 307 and 307A which release relays 306 and 306A respectively, effecting opening of contacts 310, 312 in the 244 relay circuit. Simultaneously therewith, contacts 308, 308A close the holding circuits for the three-way valve 260, stop valves 282, relay 266A, relay 277, and needle starter holding circuit. Switches 268, 270 effect closing of the needle starting circuit and energize release relay 251 to cause contact 250 to open the divider operating circuit.

When the needle operating button 212 is pressed to energize the needle starter circuit, the normally closed contact opens the needle reversing starter circuit, and the normally open contact closes the holding circuit whereupon the needle motor starts sending the needle in. The switch 276 cooperating with the needle wheel then opens the relay 277 circuit and closes the relay 266a circuit and the reverse needle starter 90R circuit. Switch 274 operated by the cam piece 272 carried by the wheel 88 then operates to open the holding circuit deenergizing the needle forward 90F circuit stopping the needle motor, and closes the needle retracting circuit 90R.

Thus, when the needle has been projected through the sleeves 126, the cam piece 272 carried by the needle wheel 88 engages the switch 274 which opens the holding circuit deenergizing the needle starter 90F stopping the needle motor 90 and the needle. After threading the needle, the needle retracting button 214 may be pressed to energize the reversing starter 90R, the normally open needle retracting circuit also being closed by the switch 274 at the end of the advancing stroke so as to assume operation in the proper sequence. When the needle is retracted, the switch 276 is engaged by the projection on the needle wheel 88 which opens the circuit to the needle reversing starter 90R deenergizing the motor and stopping the needle, whereupon the thread may be removed from the needle and tied to retain the threads in their twisted condition. The switch 276 also deenergizes the three-way valve 260 by energizing the relay 277 to open the circuit at 278 to reduce the pressure in the twister cylinders, and when the pressure reaches a preset value, the pressure controller contact 280 closes energizing the stop valves 282 whereupon the stop arms 166 are retracted. Upon retraction of the stop arms 166 switches 284 are operated by projections on the arms to open the contacts at 286, 288 to deenergize relays 290, 292 and to energize releasing relays 294, 296 respectively whereupon contacts at 298, 300 are closed holding the stop valves 282 energized. Simultaneously therewith contacts 302, 304 are opened deenergizing relay 277 whereupon contact 278 closes to energize the three-way valve 260 returning full pressure to the twisting cylinders 154, 155. The pressure controller contact 280 now opens the stop valve 282 circuit, and the cylinders 154, 155 operate to cause the twisting sleeves 126 to make one-quarter turn to permit removal of the fringes from the twisting sleeves. When the piston rods 152, 153 come to rest against stops 167, switches 303, 303a are operated to complete the divider retracting circuit, thus preventing retraction of the dividing head before the quarter turn has been accomplished.

Upon pressing of the needle retracting button 214 the following series of events occur: The relay 266A is energized latching in that position closing contact 263, holding relay 266a and needle reversing starter 90R energized, and the relay 277 circuit is closed; then contact 264 opens the needle starting circuits; the needle reversing starter 90R is energized closing holding contact; the normally closed contact opens the needle forward 90F circuit, and the normally open contact closes the holding circuit. Then the needle motor starts bringing the needle out whereupon switch 274 opens the needle reversing circuit and closes the needle advancing circuit. Switch 276 then opens the needle reversing holding circuit, deenergizing the reversing starter 90R, whereupon the needle motor 90 is stopped, stopping the needle. Switch 276 is then closed, energizing the relay 277, and contact 279 closes the relay 277 holding circuit and energizes release 255a with no effect, and contact 278 opens, deenergizing the three-way valve 260. The pressure in the twister cylinders 154, 155 then drops, and when the pressure reaches a preset value the pressure controller contact 280 closes, energizing the stop valves 282. This effects retraction of the stop arms 266 operating switches 284 which operate contacts 286, 288 to deenergize relays 290, 292 and energize releases 292, 294 respectively. This effects closing of contacts 298, 300 holding the stop valves 282 energized, and contacts 302, 304 open, deenergizing relay 277 and release 255a. Contact 270 opens the relay 277 holding circuit, and contact 278 closes, energizing the three-way valve 260 returning full pressure to the twister cylinders 154, 155. The pressure controller contact 280 opens the stop valve circuit, the twisting sleeves rotate one-quarter turn and switches 303 and 303a effect closing of the divider retracting circuit, as described.

The divider retracting button 216 may now be pushed to effect retraction of the dividing head 26 and removal of the fringes from the twisting head 28. Pressing of the button 216 effects energization of the relay 306 which opens a contact at 308 to open the circuit to the three-way valve 260 and to the stop valves 282. Simultaneously therewith, relays 266a and 277 and the needle holding circuit are deenergized, and release 244a is energized whereupon the spreaders and the dividers move out.

The divider retracting button 216 may then be released whereupon release 244a and relay 306 are deenergized, opning contact 310 in the relay 244 circuit; contact 308 closing the circuits to the three-way valve 260, stop valves 282, relays 266a and 277 and the needle retracting 90R holding circuit.

The twist return button 218 may now be pressed to effect energization of relay 277 whereupon contact 279 closes the relay holding circuit, and contact 278 opens deenergizing the three-way valve 260 causing the pressure in the twisting cylinders to drop. When the pressure reaches a preset value, the pressure controller contact 280 closes the circuit to the stop valves 282. The pistons 152, 153 are now permitted to be moved out of the cylinders by the weights 162, 163 to return the twisting sleeves to their initial position, the return movement effecting deenergization of the stop valves 282 and permitting return of the stop arms to their original position.

The circuits are actuated in the following manner upon return of the pistons 152, 153 to their original position: Contacts 303, 303a open the 244a release circuit; contacts 268, 270 open the needle operating circuits 90F, 90R; contacts 301, 301a open deenergizing 307 and 307A releases respectively; switch 301 closes the divider retracting circuit and energizes relay 306 latching in that position; switch 301a closes energizing relay 306a, latching in that position; contacts 308 and 308a open the holding circuits to the three-way valve 260, stop valves 282, relay 266a, relay 277 and the needle reversing starter 90R. The stop valves 282 are thus deenergized, and the stop arms 266 return to their starting position. Switch contacts 286, 288 open to deenergize releases 294, 296 respectively, latching in that position; and contacts 298, 300 open the stop valves 282 holding circuit. Then contacts 302, 304 close the relay 277 circuit and energize the relay 266a, the latter being deenergized momentarily until contact 302 or 304 closes.

The air lines supplying air under pressure to the various air motors are diagrammatically illustrated in Fig. 13 wherein the main supply line 350 which may be connected to a regulated source of compressed air is provided with a manual valve 352 and with conventional controls, such as a trap 354, regulator 356 and lubricator 358. In order to assure that sufficient pressure is present in the lines to operate the air motors, a pressure operated safety switch 360 is also included in the air line, see also Fig. 15, which is arranged to open the control circuit 224 in the event that the air pressure falls below a predetermined minimum.

From the above description it will be seen that the present electrical control provides an interlocking system wherein the various operations must be performed in a predetermined sequence, pressing of the switch buttons in other than the predetermined sequence having no effect since all of the operations are interlocked, with the exception that the robe feed buttons may be pressed at any time to permit the operator to straighten and align the robe when necessary. Furthermore, in practice in the event that the robe is not initially aligned properly when the divider is advanced, the divider may be retracted, and the robe straightened, whereupon the dividing head may again be advanced and the normal sequence again resumed.

While the preferred embodiment of the invention has been herein illustrated and described, it will be understood that the invention may be embodied in other forms within the scope of the following claims.

Having thus described the invention, what is claimed is:

1. In a robe fringing machine of the character described, in combination, a dividing head provided with a plurality of equally spaced dividing blades movable into engagement with the warp threads extended between robe sections to form substantially equal bunches thereof, a twisting head having a plurality of spaced teeth offset relative to the dividing blades and arranged to engage the center of each divided bunch to separate them into substantially equal half bunches upon continued movement of the dividing head, the dividing blades entering the slots between said teeth and forming with said slots a guideway on each side of a dividing blade for receiving the individual half bunches, a plurality of hollow twisting sleeves rotatably mounted in said twisting head at the end of each slot, each hollow sleeve being open on one side to receive the half bunches when the open side is aligned with its slot, each hollow sleeve having a twisting blade extended across the axis thereof toward the open side and cooperating with said dividing blade to positively guide a half bunch from each guideway into each side of said twisting blade, and means for rotating the hollow sleeves to twist the half bunches together to form the fringe.

2. In a robe fringing machine of the character described, in combination, a dividing head provided with a plurality of equally spaced dividing blades movable into engagement with the warp threads extended between robe sections to form substantially equal bunches thereof, a twisting head having a plurality of spaced teeth offset relative to the dividing blades and arranged to engage the center of each divided bunch to separate them into substantially equal half bunches upon continued movement of the dividing head, the dividing blades entering the slots between said teeth and forming with said slots a guideway on each side of a dividing blade for receiving the individual half bunches, a plurality of hollow twisting sleeves rotatably mounted in said twisting head at the end of each slot, each hollow sleeve being open on one side to receive the half bunches when the open side is aligned with its slot, each hollow sleeve having a twisting blade extended across the axis thereof toward the open side and cooperating with said dividing blade to positively guide a half bunch from each guideway into each side of said twisting blade, and means for rotating the hollow sleeves to twist the half bunches together to form the fringe, each of said hollow sleeves having a transverse opening therein extending parallel to and medially of each twisting blade, said sleeves being rotated to dispose the openings in alignment to form a passageway through which a thread may be extended between the half bunches to retain the fringes in their twisted condition.

3. A robe fringing machine as defined in claim 1 wherein the dividing blades are resiliently mounted in said dividing head, and wherein means are provided for limiting the advance of the resiliently mounted blades relative to the twisting head, and means are provided carried by the dividing head for advancing the half bunches through said guideways and into said hollow twisting sleeves upon continued advance of the dividing head relative to the dividing blades and the twisting head.

4. A robe fringing machine as defined in claim 1 which includes tensioning means engageable with the edges of adjacent robe sections for maintaining the warp threads in a taut condition during the twisting operation.

5. A robe fringing machine as defined in claim 2 wherein the twisting head is slotted between the twisting sleeves to form passageways for said retaining thread when the transverse openings in the hollow sleeves are aligned therewith, and a central blade carried by the dividing head is arranged to enter said slotted portions to close the open ends thereof and form therewith a continuous guideway through the dividing head and the twisting sleeves having their transverse openings aligned therewith, and means are provided for projecting a needle through said continuous guideway for extending the retaining thread through the twisted fringes.

6. A robe fringing machine as defined in claim 2 which includes control means for limiting the number of turns of said twisting sleeves and for disposing the transverse openings in alignment to receive said retaining thread, and for thereafter permitting additional rotation of the sleeves to present the open sides thereof in alignment with their respective slots in the twisting head to permit removal of the completed fringes.

7. A robe fringing machine as defined in claim 6 which includes means carried by the dividing head for removing the twisted fringes from the sleeves upon retracting movement of the dividing head.

8. In a robe fringing machine of the character described, in combination, a plurality of rotatably mounted hollow twisting sleeves open on one side, each sleeve having a twisting blade extended across the axis of the hollow portion and adapted to receive equally divided half bunches of warp threads on each side of a blade, means for initially dividing the warp threads into equal full bunches, and means for thereafter separating the divided bunches into half bunches prior to entering the twisting sleeves, and means for positively guiding the half bunches into each side of the twisting blade.

9. In a robe fringing machine of the character described, in combination, a rotatably mounted twisting element comprising a hollow sleeve open on one side and having a twisting blade extended across the axis of the hollow portion and toward the open side thereof, means for guiding equal bunches of warp threads into each side of the twisting blade to form a fringe, each twisting sleeve having a transverse opening extended medially of and parallel to said twisting blade whereby to permit a retaining thread to be extended through the opening and between the equal bunches extended across the twisting blade.

10. A robe fringing machine as defined in claim 2 which includes operating means for moving the dividing head into and out of operative relation to said twisting head, said operating means including an air motor, and means for controlling the operation of said air motor.

11. A robe fringing machine as defined in claim 2 wherein the means for rotating the hollow sleeves includes chain and sprocket drives extended in opposite directions and arranged to cooperate with alternate of said twisting sleeves, a pair of air motors, one end of each chain being connected to the piston of its respective air motor to effect rotary movement in one direction to perform the twisting operation, the other end of each chain having a weight arranged to effect movement of the chain in the opposite direction to return the twisting sleeves to their original position.

12. A robe fringing machine as defined in claim 11 which includes cooperating air motors provided with stop means for limiting the initial movement of said chain operating motors to effect a predetermined number of revolutions of the twisting sleeves and to dispose the sleeves with their transverse thread receiving openings in alignment, control means for effecting removal of the stop means to permit further rotation of the twisting sleeves to a position to permit removal of the twisted fringes, and means for thereafter reducing the pressure in the chain operating motors to permit the sleeves to be rotated in a reverse direction by said weights.

13. In a robe fringing machine of the character described, in combination, a plurality of robe handling and fringe forming mechanisms for performing a plurality of operations in a predetermined sequence to provide fringes on the robe, said mechanisms including: robe advancing and retracting mechanism for moving the robe into operative position to be fringed; divider advancing and retracting mechanism for thereafter separating portions of the robe into equal bunches to be twisted; fringe twisting mechanism for twisting the bunches thus formed; and needle advancing and retracting mechanism for pulling a tie thread through the twisted fringed portions to maintain the same in their twisted condition, and control means associated with each of the mechanisms for preventing operation of a particular mechanism in other than said predetermined sequence.

14. In a robe fringing machine of the character described, in combination, a plurality of robe handling and fringe forming mechanisms for performing a plurality of operations in a predetermined sequence to provide fringes on the robes, said mechanisms including: robe advancing and retracting mechanism for moving the robe into operative position to be fringed; divider advancing and retracting mechanism for thereafter separating portions of the robe into equal bunches to be twisted; fringe twisting mechanism for twisting the bunches thus formed; and needle advancing and retracting mechanism for pulling a tie thread through the twisted fringed portions to maintain the same in their twisted condition, and electrical control means associated with said mechanisms including interlocking controls for preventing operation of the various mechanisms in other than said predetermined sequence.

15. A robe fringing machine as defined in claim 14 wherein the electrical control means includes a circuit having a plurality of manually pressed push button switches for initiating performance of different operations, said interlocking controls preventing initiation of a particular mechanism unless the control buttons are pressed in said predetermined sequence.

16. A robe fringing machine as defined in claim 14 wherein the electrical control means includes a circuit having a plurality of manually pressed push button switches for initiating performance of different operations, said interlocking controls preventing initiation of a particular mechanism unless the control buttons are pressed in said predetermined sequence, said mechanisms including pneumatically operated means, and air lines connected to said pneumatically operated means, said control means including solenoid operated valves in said air lines for controlling the operation of said pneumatically operated means.

References Cited in the file of this patent

UNITED STATES PATENTS

| 114,562 | Howard | May 9, 1871 |
| 567,590 | Gledhill | Sept. 15, 1896 |

FOREIGN PATENTS

| 214,067 | Germany | Oct. 9, 1909 |